Patented May 11, 1943

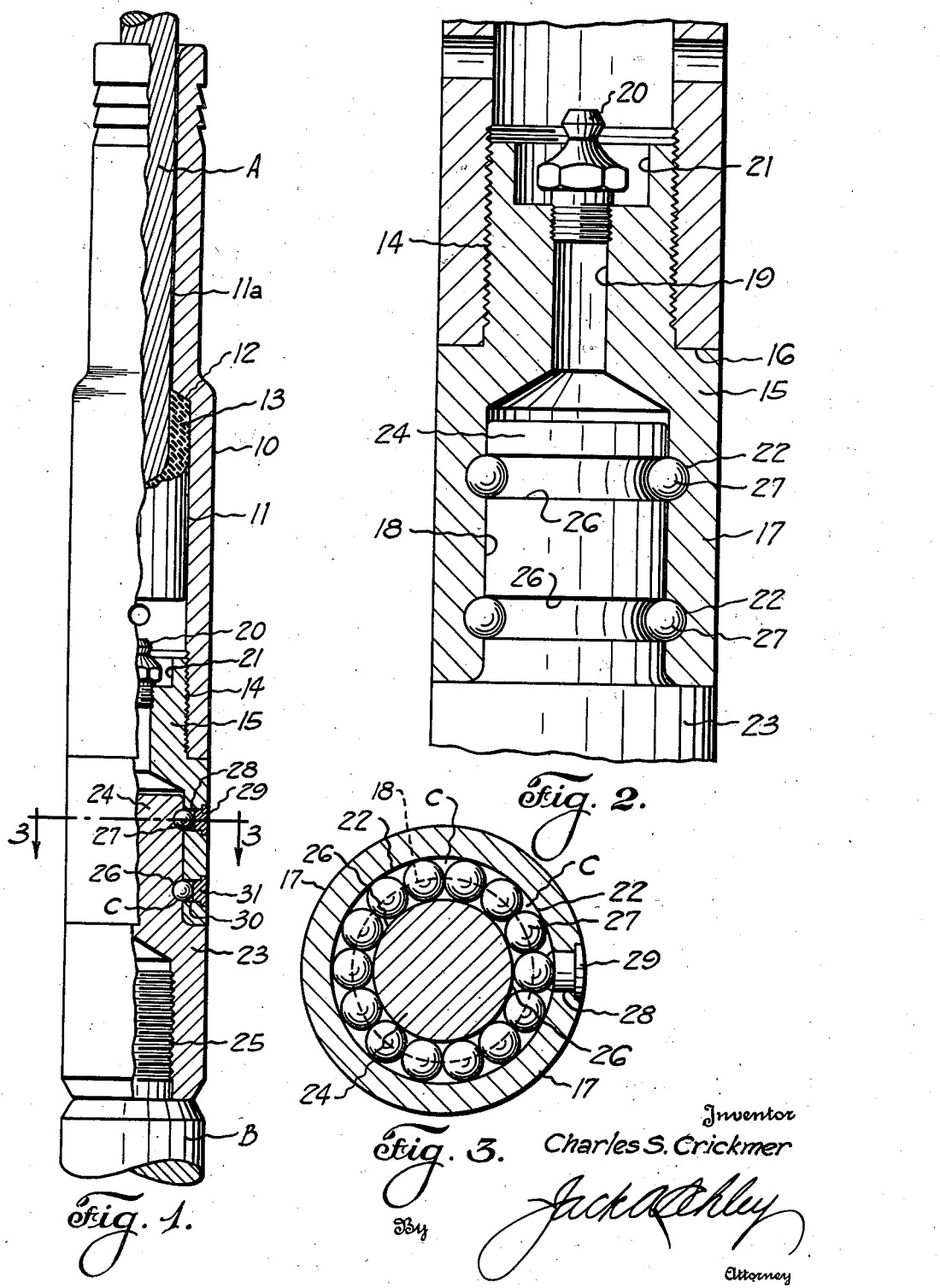

2,318,839

UNITED STATES PATENT OFFICE 2,318,839

SWIVEL SOCKET

Charles S. Crickmer, Dallas, Tex.

Application November 14, 1941, Serial No. 419,175

3 Claims. (Cl. 287—91)

This invention relates to new and useful improvements in swivel sockets.

One object of the invention is to provide an improved swivel socket which is particularly adaptable for use in connecting a drilling line, rod or cable with a tool, whereby the tool may be lowered or raised by means of said line without twisting or "kinking" said line.

An important object of the invention is to provide an improved swivel socket having complementary members which are rotatably connected to each other, together with means for retaining a lubricant within the socket, whereby the movable parts of the socket are properly lubricated at all times.

Another object of the invention is to provide an improved swivel socket wherein one member which is connected to the lowering element telescopes a complementary member which is fastened to the tool, said members being rotatably connected by a plurality of ball bearings which are insertable from the exterior of said socket; the construction being such that the weight of the tool is carried by said ball bearings, whereby binding of the swivel which would prevent rotation is obviated.

A further object of the invention is to provide an improved socket of the character described, which is simple in construction and which consists of a minimum number of parts; the device being arranged so as to facilitate the connection of the cable and tool to said socket.

The construction designed to carry out the invention will be hereinafter described together with other features of the invention.

The invention will be more readily understood from a reading of the following specification and by reference to the accompanying drawing, as an example of the invention is shown, and wherein:

Figure 1 is a view, partly in section and partly in elevation, of a swivel socket, constructed in accordance with the invention, Figure 2 is an enlarged, transverse, vertical sectional view of the central portion of the socket and showing the bearing connection between the rotating elements of the socket, and Figure 3 is an enlarged, horizontal cross-sectional view, taken on the line 3—3 of Figure 1.

In the drawing, the numeral 10 designates an elongate, tubular body which has a bore extending entirely therethrough. The upper end of the bore of the body is reduced as shown at 11a and obviously, the reduction in the size of the bore provides an internal annular shoulder 12 intermediate the ends of the body. A flexible line or cable A has its lower end insertable through the reduced portion 11a of the bore and the extreme lower end of the cable is adapted to be disposed within the bore 11 below the shoulder 12. This end of the line or cable is securely fastened within the bore 11 by means of babbitting 13, which may be poured into the bore by inverting the body 10. The babbiting, when hardened, securely fastens the cable within the body 10.

The extreme lower end of the bore of the body is internally screw-threaded at 14 to receive the upper reduced end of an annular shell 15. As is clearly shown in Figure 2, the shell 15 is formed with an external shoulder 16 which is adapted to abut the lower end of the body 10 when the shell is screwed into the bore 11. The lower portion of the shell forms an annular skirt 17 which is provided with an axial bore 18. The bore 18 is reduced, as shown at 19, and the upper end of this reduced portion is arranged to receive a grease cup 20 which is threaded thereinto. The extreme upper end of the shell may be recessed as shown at 21 to accommodate the cup 20.

Annular grooves 22 are formed within the shell 17, said grooves being substantially semicircular in shape and being cut out of the wall of the bore 18. A coupling collar 23, which is provided with an integral, upwardly extending shank 24, has the lower end of its bore provided with screw threads 25, whereby a suitable tool B may be connected thereto. The shank 24 of the coupling 23 is insertable within the bore 18 of the skirt 17 and this shank is provided with annular grooves 26 in its external surface. The grooves 26 are also substantially semicircular in cross-section and are complementary to the grooves 22 in the shell.

For rotatably connecting the coupling 23 to the shell and also for retaining said coupling on said shell, a plurality of ball bearings 27 are disposed within the annular channels C which are formed by the complementary grooves 22 and 26. As is clearly shown in Figure 2, the balls substantially fill the channels and provide a rotatable connection between the shank 24 and the shell 15. The ball bearings 27 in the upper channels C may be introduced into the channels through a radial opening 28 which extends outwardly from the grooves 22 through the wall of the skirt 17 of the shell 15. After the balls are disposed within the channel, a suitable plug 29 may close the opening 28. A similar radial opening 30 extends outwardly from the lower groove 22 whereby the balls may be introduced into the lower channel C. A similar plug 31 is adapted to close the opening 30.

In using the swivel, the flexible line or cable A is first attached to the body 10, prior to the time that the shell 15 is threaded into the lower end of the body. After the line has been secured to the body, the shell 15 is threaded thereinto. However, prior to the connection of the shell to the body, the shell has been assembled with the coupling collar 23 whereby the shank 24 is rotatably connected to the shell through the ball bearing 27. Also, a suitable lubricant is introduced through the grease cup 20 and entirely fills the reduced portion 19 of the bore 18, as well as the space immediately above the upper end of the shank 24. This lubricant is retained within this space which forms a lubricant chamber, and obviously, said lubricant will constantly seep downwardly between the shank 24 and the shell 15 to lubricate the bearings 27 and also the contacting surfaces of the shank and shell.

After the shell 15 is threaded into the body, the tool which is to be lowered is connected into the collar 23, the upper end of such tool being indicated at B in Figure 1. Since the tool is directly attached to the coupling collar 23 and the cable is directly attached to the body 10, these parts are freely rotatable relative to each other because of the rotatable connection between the coupling 23 and the shell 15 which is threaded into the body 10. Thus, as the tool is lowered or raised, said tool may freely rotate relative to the line or cable A, with the result that twisting or kinking of said line is eliminated. The provision of the lubricant chamber assures that the rotating or moving parts of the swivel are constantly lubricated, whereby free rotation is had and excessive wear is obviated.

The socket is simple in construction and comprises a minimum number of parts. Only three main elements are necessary and if it was not desired to remove the line A from the body 10, it would be possible to make the body integral with the shell, in which case the device would comprise only two main working parts. The use of the ball bearings 27 not only provide for a frictionless rotative connection, but also provide an efficient retaining means for holding the shank 24 within the shell 15. The plugs 29 and 31 could be threaded into the openings 28 and 30 respectively, whereby the balls 27 may be removed to disassemble the device at any time. The weight of the tool B is carried solely by the ball bearings 27 and the danger of a binding which would prevent rotation is substantially eliminated.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A socket for rotatably connecting a flexible line with a tool including, a tubular body having the flexible line insertable and secured within the upper end of its bore, a coupling adapted to be connected with the tool to be lowered and having an upwardly extending shank, a tubular connecting element secured within the lower end of the bore of the body and having the lower end of its bore enlarged to form a recess adapted to receive the shank of the coupling, and means for rotatably fastening said shank within the recess of the element, the upper end of the bore of said element being closed by a plug whereby the upper portion of said bore above said recess serves as a lubricating chamber for receiving a lubricant for the rotatable fastening means.

2. A socket for rotatably connecting a flexible line with a tool including, a tubular body having the flexible line insertable and secured within the upper end of its bore, a coupling adapted to be connected with the tool to be lowered and having an upwardly extending shank, a connecting element screw-threaded within the lower end of the bore of the body and having an axial bore extending therethrough, the lower portion of the element bore being enlarged to provide a recess adapted to receive the shank of the coupling, said shank and the wall of the recess having complementary grooves which form annular channels, and a plurality of ball bearings mounted in each channel for rotatably retaining the shank within said recess, the upper portion of said element bore serving as a lubricant chamber for receiving a lubricant which maintains the ball bearings lubricated, the screw-threaded connection between the element and body permitting disconnection of the coupling and body without interfering with said ball bearings or the lubricant chamber.

3. A socket for rotatably connecting a flexible line with a tool including, a tubular body having the flexible line insertable and secured within the upper end of its bore, a coupling adapted to be connected with the tool to be lowered and having an upwardly extending shank, a tubular connecting element removably secured within the lower end of the bore of the body, the element having an axial bore which has its lower portion enlarged to provide an axial recess for receiving the shank of the coupling, said shank and the wall of the recess having complementary grooves which form annular channels, a plurality of ball bearings mounted in each channel for rotatably retaining the shank within said recess, and means for closing the upper end of the bore of the element, whereby a chamber for receiving a lubricant is provided by said bore between the shank and closing means, the removable connection between the body and element permitting disconnection of the coupling and body without interfering with said ball bearings or the lubricant chamber.

CHARLES S. CRICKMER.